US009740597B2

(12) United States Patent
Rose et al.

(10) Patent No.: US 9,740,597 B2
(45) Date of Patent: Aug. 22, 2017

(54) TRANSACTIONAL EXECUTION OF NATIVE METHODS

(71) Applicant: Oracle International Corporation, Redwood Shores, CA (US)

(72) Inventors: John R. Rose, San Jose, CA (US); Victor Luchangco, Cambridge, MA (US); David Dice, Foxboro, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/641,828

(22) Filed: Mar. 9, 2015

(65) Prior Publication Data

US 2016/0267000 A1 Sep. 15, 2016

(51) Int. Cl.
*G06F 11/36* (2006.01)
*G06F 9/44* (2006.01)
*G06F 9/46* (2006.01)

(52) U.S. Cl.
CPC ............ *G06F 11/3688* (2013.01); *G06F 8/70* (2013.01); *G06F 9/4425* (2013.01); *G06F 9/466* (2013.01); *G06F 9/467* (2013.01)

(58) Field of Classification Search
CPC ............ G06F 11/3466; G06F 11/3409; G06F 11/3419
USPC ....................................................... 717/127
See application file for complete search history.

(56) References Cited

U.S. PATENT DOCUMENTS

| 2009/0204785 | A1* | 8/2009 | Yates, Jr. | G06F 9/30174 711/205 |
| 2011/0145637 | A1* | 6/2011 | Gray | G06F 11/141 714/15 |
| 2014/0032758 | A1* | 1/2014 | Barton | H04L 41/00 709/225 |
| 2014/0196004 | A1* | 7/2014 | Weinsberg | G06F 8/30 717/106 |
| 2014/0337528 | A1* | 11/2014 | Barton | H04L 63/10 709/225 |

\* cited by examiner

*Primary Examiner* — John Chavis
(74) *Attorney, Agent, or Firm* — Hickman Palermo Becker Bingham LLP

(57) ABSTRACT

Approaches for more efficiently executing calls to native code from within a managed execution environment are described. The techniques involve attempting to execute a native call, such as a call to a C function from within Java code, using a single hardware transaction. Not only is the native code executed in a hardware transaction, but also various transitional operations needed for transitioning between managed execution mode and native execution mode. If the hardware transaction is successful, at least some of the operations that would normally be performed during transitions between modes may be omitted or simplified. If the hardware transaction is unsuccessful, the native calls may be performed as they normally would, outside of hardware transactions.

47 Claims, 6 Drawing Sheets

TRANSACTIONAL EXECUTION OF NATIVE METHODS

FIELD OF THE INVENTION

The present invention relates generally to optimizing the processing of computer instructions, and more specifically to optimizations for transitioning between a managed execution mode and a native execution mode.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many computer programming environments involve computer code that is intended to be executed in a managed execution mode. That is, a coordinating process or processes manages execution of the computer code by providing various services to the computer code for performing common administrative tasks. The coordinating process(es) are collectively referred to herein as a "runtime system," or simply "runtime." The exact services provided in a managed execution mode vary depending on the embodiment, but may include without limitation any or all of garbage collection, other memory management operations, thread management, lock management, task scheduling, profiling, optimizations, dynamic compilation, and so forth.

For various reasons, however, it is sometimes desirable to execute instructions outside of a managed execution mode. For example, there may be certain types of operations that cannot be satisfactorily performed within the managed execution mode. This may be for a variety of reasons. For instance, the operations may make "unsafe" use of a memory area, which would not be allowed by constraints enforced in the managed execution mode. Or, the operations may involve communicating with a driver or other component that does not provide an interface that may be used in the managed execution mode. Or, the non-managed instructions may be capable of performing the operations significantly faster than would be possible in the managed execution mode, on account of not requiring the overhead of providing the runtime services.

Accordingly, some programming environments allow a computer program to temporarily exit the managed execution mode and execute "native" code segments in a "native execution mode" outside of the managed execution mode. Execution of the native code segments in the native execution mode occurs without the managing runtime providing some or all of the aforementioned services. Instead, execution of the native code segments may be managed by an entirely different runtime that does not provide the same set of services or even necessarily any services. Or, the native code may be in a machine language that is directly executable by a processor without any management from a runtime. Upon completion of executing a native code segment, execution of the computer program resumes in the managed execution mode. For instance, in the Java programming language, it is possible to instruct a thread to transition from Java code to native code (such as compiled C code), execute the native code, and then transition back to the Java code.

However, while it is sometimes useful to transition from managed execution mode to native execution mode and back again, the overhead costs involved in making such transitions are often high enough to deter the use of such transitions when executing the native code might otherwise be useful. Or, the overhead costs may encourage undesirable programming practices such as remaining in native mode to run code that would be better suited for managed mode, simply because the programmer intends to return to native mode again, and does not want to incur additional transition costs.

SUMMARY

Approaches for more efficiently executing calls to native code from within a managed execution environment are described. The techniques involve attempting to execute a native call, such as a call to a C function from within Java code, using a single memory transaction of a transactional memory. Not only is the native code executed in a memory transaction, but also various transitional operations needed for transitioning between managed execution mode and native execution mode. If the memory transaction is successful, at least some of the operations that would normally be performed during transitions between modes may be omitted or simplified. If the memory transaction is unsuccessful, the native calls may be performed as they normally would, outside of memory transactions. The technique may also involve a memory transaction in which native code calls back into managed code.

DETAILED DESCRIPTION

Figure 1:
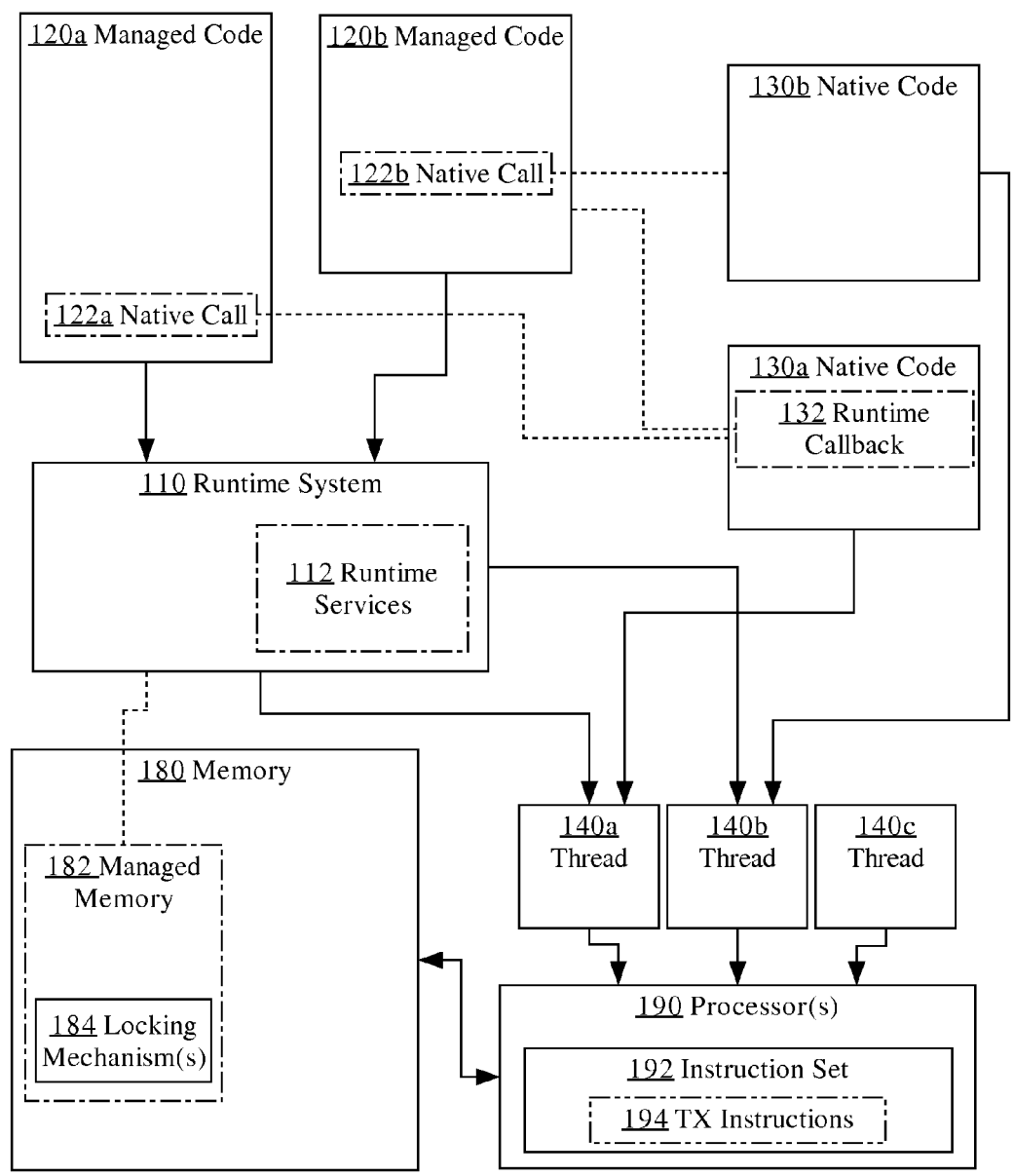
FIG. 1 illustrates an example system in which the described techniques may be practiced, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

According to an embodiment, program code segments are executed in a first execution mode. In the program code segments are detected one or more calls to execute one or more code segments in a second execution mode. One or more processors attempt to execute the one or more calls as one or more memory transactions, wherein at least a particular call of the one or more calls is a candidate for successfully completing the attempted execution and is a candidate for not successfully completing the attempted execution. The one or more processors detect whether at least a particular attempted memory transaction to execute the particular call of the one or more calls completed successfully. Responsive to detecting that the particular attempted memory transaction to execute the particular call did not complete successfully, the particular call is executed outside of any memory transaction.

In an embodiment, a first portion of program code is executed in a managed execution mode. In the program code, a native call is detected. The native call is to native code whose instructions are to be executed in a native execution mode. An attempt is made to execute the native call in the native execution mode using a memory transaction of a transactional memory. If the memory transaction fails, the native call is executed in the native execution mode outside of any memory transaction. Upon successful completion of the memory transaction, or upon executing the native call outside of any memory transaction, execution of the program code continues with a second portion that is executed in the managed execution mode.

In an embodiment, when executing the native call outside of any memory transaction, at least a first transition operation is performed, so as to safely transition from the managed execution mode to the native execution mode, or to safely transition from the native execution mode to the managed execution mode. The attempt to execute the native call as a memory transaction involves utilizing transactional features of the memory transaction to attempt to omit the first transition operation. In an embodiment, the first transition operation is one of: obtaining a lock, polling for a safepoint, or writing status information.

In an embodiment, executing the program code in the managed execution mode comprises providing one or more services with respect to execution of the program code. Executing the native code in the native execution mode does not comprise providing the one or more services.

In an embodiment, responsive to the transaction failing, the native call is marked as being unamenable to memory transactions. Based on the marking, no attempt is made to execute subsequent iterations of the native call as a memory transaction. In an embodiment, an attempt is made to execute the native call as a hardware transaction only after determining that the executing computing device includes a processor configured to support the hardware transaction.

In an embodiment, if the native call is executed outside of any memory transaction, a transition operation must be performed when transitioning between the managed execution mode and the native execution mode. In an embodiment, the transition operation involves at least writing a value to a particular data structure in a memory that is shared amongst multiple threads. By contrast, when attempting to execute the memory transaction, optimized transition code is generated based on an assumption that the particular data structure will not be read by any other thread during the memory transaction. The optimized transition code thus does not comprise writing the value to the particular data structure. The memory transaction terminates unsuccessfully if any other thread attempts to read or write the particular data structure during the memory transaction.

In an embodiment, the transition operation involves at least determining whether a condition is met based on a particular data structure in a memory that is shared amongst multiple threads. By contrast, attempting to execute the memory transaction comprises generating optimized transition code based on an assumption that the particular data structure will not change during the memory transaction. The optimized transition code thus does not comprise polling for a value of the particular data structure. The memory transaction terminates unsuccessfully if it is determined that the particular data structure has changed during the memory transaction.

In an embodiment, attempting to execute the memory transaction comprises passing arguments to the native code by address. By contrast, executing the native call outside of the transaction comprises passing the arguments by handles and temporarily returning to the managed execution mode to identify addresses associated with the handles.

In an embodiment, multiple consecutive native calls are detected. An attempt is made to perform the consecutive native calls as a single memory transaction.

In other aspects, the invention encompasses a computer apparatus and a computer-readable medium configured to carry out the foregoing.

2.0. System Overview

FIG. 1 illustrates an example system 100 in which the described techniques may be practiced, according to an embodiment. FIG. 1 is but one example of a system in which the described techniques may be practiced. Other systems may include fewer or additional elements in varying arrangements.

System 100 comprises one or more computer processors 190. Although any number of processors 190 may be present, for convenience this description will refer to the one or more processors 190 collectively as processor 190. Processor 190 is configured to execute a variety of operations in response to instructions in an instruction set 192. Example instruction sets 192 include the x86 instruction set architecture, the ARM architecture, the PowerPC architecture, the SPARC architecture, and so forth.

In an embodiment, at least some systems 100 include processors 190 whose supported instructions sets 192 include a special set of transactional instructions 194 that support hardware transactional memory operations. The transactional memory operations may include, for instance, Hardware Lock Elision (HLE) operations that allow optimistic execution of a critical section by eliding the write to a lock. The transactional memory operations may also or instead include, for instance, Restricted Transaction Memory (RTM) operations. Example implementations of transaction instructions 194 may include, for instance, the Transaction Synchronization Extensions (TSX) by Intel Corporation, and Advanced Synchronization Facility (ASF) by Advanced Micro Designs, though the techniques described are not limited to any specific implementation. The former of these implementations is described in the document "Transactional Synchronization in Haswell" by James Reinders, dated Feb. 7, 2012, available at the time of writing at on the server "software.intel.com" at the address of "/en-us/blogs/2012/02/07/transactional-synchronization-in-haswell," the entire contents of which is hereby incorporated by reference for all purposes as if set forth herein.

In an embodiment not having hardware transactions, memory transactions may be implemented using software transactional memory. Examples of software transactional memory implementations include Haskell STM, Multiverse, and the GNU Compiler Collection. Alternatively, an embodiment may emulate hardware transactions by emulating a processor, an instruction set, microcode, or firmware that has hardware transactions. A hybrid embodiment may include a combination of any of software transactional memory, hardware transactions, and emulated hardware transactions. Many techniques herein, although explained through examples using hardware transactions, are also applicable to implementations that instead use software transactional memory, hardware emulation, or a hybrid of hardware and software.

System 100 further includes one or more memories 180, collectively referred to herein as memory 180. Memory 180 may be any combination of computer-readable media accessible to processor 190. For instance, memory 180 may be a volatile memory such as a Random Access Memory (RAM). Processor 190 is configured to read from and write to various areas within memory 180 in response to instructions to perform operations supported by instruction set 192.

Processor 190 supports multiple threads 140 of execution, including threads 140a-140c. Each thread 140 is a different sequence of instructions. At least some of threads 140 may be executed concurrently, either by different processors 190, different cores of processors 190, or using time-division multiplexing on a single processor 190. As used herein, a thread 140 may be process, or a thread inside a process. Depending on the embodiment, threads 140 may be hardware threads supported directly by the processor 190, software-based constructs maintained by an operating system running on the processor 190, and/or software-based constructs generated by a runtime system 110 and mapped to lower-level thread types. In an embodiment, certain threads 140 may share a same address space within memory 180, and thus share access to the same data.

2.1. Runtime System

System 100 comprises a runtime system 110. Runtime system 110 may be any suitable set of components and/or computer processes configured to manage execution of program code segments in a specific language, such as managed code segments 120. A program segment is a sequence of executable instructions. Program segments may be loaded or linked to form an executable program. By way of non-limiting example, runtime system 110 may be the Java Runtime Environment for executing Java-based applications, or a runtime for executing code written in any other suitable language, and managed code segments 120 may be Java source code, Java bytecode, or some other intermediate representation of Java source code. Although only two managed code segments 120 are depicted, runtime system 110 may in fact be configured to manage execution of any number of managed code segments 120.

In an embodiment, the components or processes of runtime system 110 are invoked in response to an operating system receiving a request to execute managed code segments 120, including managed code 120a and 120b, that are associated with runtime system 110. For instance, the operating system may be configured to automatically start executing the runtime system 110 when receiving requests to execute certain types of files (e.g. files containing the managed code segments 120), and to direct the runtime system 110 to those files. In an embodiment, the runtime system 110 may be implemented by compiled code that is embedded directly within a file or files that contain managed code 120. In an embodiment, runtime system 110 may be a set of components or processes that an operating system persistently executes, or may even be the operating system itself.

In an embodiment, runtime system 110 may be or include a virtual machine configured to interpret program code segments in a platform independent language, and issue instructions to a processor, such as processor 190, that cause the processor to implement the program code segments. In an embodiment, runtime system 110 may be or include any type of interpreter configured to cause processor 190 to implement managed code 120. Runtime system 110 may therefore compile, translate, or otherwise convert higher-level instructions found in managed code 120 into lower-level instructions executable by processor 190 and/or by an intermediate component such as an operating system. Runtime system 110 generates the one or more execution threads 140, including the depicted threads 140a and 140b, to execute specific sequences of such lower-level instructions.

In other embodiments, some or all of managed code 120 may be code that is already compiled in a form that is directly executable by a processor 190 or intermediate operating system. Threads 140 are thus spawned as the processor 190 or host operating system attempts to directly execute managed code 120.

In an embodiment, runtime system 110 may be or include one or more coordinating processes or threads that interact with threads 140 as the threads 140 execute. For instance, managed code 120 and/or its compiled representations may include instructions that cause threads 140 to directly communicate with the runtime system 110, and/or to indirectly communicate with runtime system 110 via signaling mechanisms within a certain area of memory 180.

In an embodiment, processor 190 or an intermediate component such as an operating system allocates a managed memory area 182 for use by the runtime system 110. In turn, runtime system 110 allocates sub-portions of the memory area to different threads 140 in response to various instructions to store values, create data structures, and so forth. In an embodiment, at least some of managed memory area 182 is accessible by multiple threads 140 for purposes such as inter-thread signaling or coordination.

2.2. Runtime Services

Runtime system 110 includes one or more runtime service components 112 configured to provide runtime services when executing managed code segments. For instance, runtime service components 112 may provide any or all of memory management services, resource management services, thread management services, lock management services, task scheduling services, profiling services, debugging services, optimization services, dynamic compilation services, reflection services, and so forth.

Runtime service components 112 may provide these services in a variety of manners. For instance, runtime system 110 may include an interpreter component or virtual machine that effectively sits between a computer processor and the managed code 120, determining when to issue certain instructions from the managed code 120 to the processor 190, and when to issue instructions necessary to provide the runtime services. As another example, when managed code 120 is compiled from a human-readable source form to a lower-level representation, the compiler may inject instructions into the code to communicate with the runtime system 110 in order to perform certain operations and/or to periodically check to see if execution of the code should be halted momentarily so that the runtime service components 112 may provide certain services.

In an embodiment, the runtime service components 112 include at least a garbage collector or other automatic memory management component. The garbage collector is configured to find areas in managed memory 182 that are occupied by data objects or structures that are no longer in use by any managed threads 140. The garbage collector frees these memory areas by making the memory areas available for use for storing new data objects or structures that may be created by managed threads 140. In an embodiment, the garbage collector may identify these areas using techniques such as tracing or reference counting. In an embodiment, the garbage collector searches for areas to free on a recurring basis, such as at predefined intervals, or whenever additional free memory is demanded. In an embodiment, the garbage collector must ensure that all threads 140 managed by runtime 110 are paused or at a "safe" state before attempting locate freeable areas of memory and/or freeing those areas.

In an embodiment, the runtime service components 112 include at least a dynamic compiler or translator, such as the Java just-in-time Compiler. The dynamic compiler translates certain portions of managed code 120 to compiled code as the managed code 120 is being executed. In some embodiments, the runtime system 110 will begin executing managed code 120 by interpreting the managed code. The dynamic compiler will monitor the execution of managed code 120 for portions that are frequently repeated, and generate compiled versions of those portions. These compiled versions can be executed much more quickly than the managed code 120.

In an embodiment, the dynamic compiler functions as an optimizer as well. Working with a profiling component, the dynamic compiler dynamically determines portions of code in managed code 120 that could be made more efficient based on observed patterns of execution. The dynamic compiler generates more efficient instructions for accomplishing a same result, based on the assumption that the observed patterns will continue. The runtime system 110 is then configured to use the optimized version instead of the original portion of the managed code 120. The dynamic compiler may optimize both code that is intended to be interpreted as well as code that has already been compiled in one form or another. In an embodiment, the observed patterns may not in fact continue. The dynamic compiler may therefore be required to de-optimize the code, and instruct the runtime system to execute the less optimal version.

In an embodiment, the runtime service components 112 include at least a lock management component. Threads 140 coordinate with the lock management component prior to read and/or write operations on memory areas shared with other threads. Any suitable lock management techniques may be utilized. The lock management component may be utilized for a variety of purposes, such as ensuring that threads 140 do not conflict with each other when performing certain tasks, ensuring that certain threads remain in certain states while other runtime services are being provided, and so forth. In an embodiment, to facilitate lock management, the managed memory area 182 may be utilized to store a variety of data structures representing various types of locks. These data structures are depicted in FIG. 1 as locking mechanism 184.

2.3. Safepoints

In an embodiment, runtime system 110 employs a "stop-the-world" pause to facilitate certain types of runtime services such as, without limitation, garbage collection, code de-optimization, debugging services, deadlock searching, and so forth. Such services may require that all threads pause so that the runtime system 110 can perform operations required for these services, such as moving objects in a heap of managed memory area 182 or replacing compiled code of a method which is currently running.

An example "stop-the-world" pause mechanism is a safepoint. A safepoint is a state of application execution where all references to objects in managed memory 182 are perfectly reachable by the runtime system 110, without the risk of interference by any of threads 140. During a safepoint, all threads 140 in managed execution mode are suspended. Threads 140 running native code 130 may continue to run, as long as they do not interact with runtime system 110 (e.g. via a runtime callback 132, in which case the thread 140 may suspend until the end of the safepoint). Each managed thread 140 is configured to follow a collaborative safepoint protocol, which is essentially to check a safepoint status indicator on a recurring basis, such as a safepoint_pending flag set by a runtime service component 112, and based thereon determine whether a safepoint is needed. If a safepoint is needed, the thread 140 "parks" itself in safe state, by pausing or at very least waiting to perform certain types of instructions, until the safepoint status indicator indicates that a safepoint is no longer pending.

Safepoint checks may be performed on a variety of occasions, depending on the implementation. In an example Java-based implementation, for instance, a compiler such as the just-in-time (JIT) compiler inserts inserts safepoint checks in compiled code at certain points, such as after returning from calls or upon each iteration of a loop. A call may be an invocation of a subroutine, which may be a function, a method, or a handler. A call may initialize registers, push a stack frame onto a call stack, or adjust a program counter to perform a jump or branch. Meanwhile, for interpreted code, the Java Virtual Machine polls at bytecode boundaries for safepoints. Also, the Java Virtual Machine polls for safepoints when transitioning from native execution mode to managed execution mode.

A safepoint status check may be implemented in a variety of ways. For instance, a safepoint_pending flag may be implemented by a normal variable protected by memory barriers. In an embodiment, the safepoint check involves each managed thread 140 polling a global memory page at regular intervals. When the runtime system 110 deems that a safepoint is necessary, the runtime system places a lock on an object that the polling threads are synchronizing on. When the operations for which the safepoint was issued have completed, the runtime system 110 unlocks the object, and all threads 140 thus resume.

A processor may make an implicit check for a signal from another thread, in such a way that no explicit fence or barrier is needed. This is the case with non-cached memory locations (which the JVM does not use) and also with virtual memory permissions, which the JVM may use when polling for safepoints. When those implicit checks are made also by transactional support, then a JVM which uses those implicit checks instead of fences may also use transactional calls.

A thread may query for a safepoint request (from the GC, for example) by reading or writing a dummy value from or to a dummy location. If the read or write succeeds, there is no request and the thread continues. If there is a safepoint request active, the thread gets a memory fault, which (after some low-level recovery) causes the thread to heed the request.

2.4. Native Execution Mode

System 100 further comprises native code segments 130, which are also executable by processor 190 using threads 140. Although only two native code segments 130 are depicted, system 100 may in fact include any number of native code segments, of potentially varying types.

In contrast to managed code segments 120, which are executed by runtime system 110 in a managed execution mode, the execution of native code segments 130 occurs in a "native" execution mode, without some or all of the runtime service components 112 of runtime system 110 providing their respective services for the native code segments. For example, native code segments 130 may be code segments that are directly executable by processor 190 or an operating system that is separate from the runtime system 110.

The code segments 130 and execution mode are referred to herein as "native" in that they are often used for the purpose of executing "lower-level" instructions that are more native to the operating environment of system 100 than the types of instructions within the managed code 120. For instance, code segments 130 may be, without limitation, C code, assembly code, machine language code, and so forth. However, it will be recognized that the native code need not necessarily be "unmanaged," and in fact need not necessarily be "lower-level." Rather, the native code segments may simply be code whose execution is managed by a different type of runtime system than the managing runtime system 110.

In an embodiment, some (but not necessarily all) managed code segments 120 may include native calls 122 to certain native code segments 130. For instance managed code segment 120a comprises a native call 122a to native code segment 130a, and managed code segment 120b comprises a native call 122b to native code segment 130b. A managed code segment 130 may have any number of native calls 122 to any number of native code segments 130.

A native call 122 is an instruction to the runtime system 110, if necessary, to load a referenced native code segment 130, and then cause processor 190 to execute the native code segment 130. Execution of the native code segment 130 may occur in the same thread 140 in which execution of the managed code segment 120 occurs. Hence, when executing a native call 122, a thread 140 may transition from a managed execution mode for the code segment 120 leading up to the native call 122, to a native execution mode for the code segment 130 referenced by the native call 122. Upon completing the referenced native code segment 130, the thread 140 will then transition back to the managed execution mode for the remainder of the code segment 120. For instance, in an embodiment where the runtime system 110 is Java-based, the native call may be a call to a method in a C object file using the Java Native Interface ("JNI"). However, embodiments are not necessarily limited to any particular type of native call 122.

In an embodiment, some native code segments 130 may similarly have runtime callbacks 132. A runtime callback 132 is an instruction to the runtime system 110 to perform certain native operations, such as returning a data structure from managed memory area 182, or, execute a referenced managed code segment 130 in a managed execution mode. Execution of the managed code segment 120 may occur in the same thread 140 in which execution of the native code segment 130 occurs. Hence, when executing a runtime callback 132, a thread 140 may transition from a native execution mode for the code segment 130 leading up to the runtime callback 132, to a managed execution mode. Upon completing the managed execution mode, the thread 140 will then transition back to the native execution mode for the remainder of the native code segment 130.

For instance, a native code segment 130 may need to access data structures found in managed memory area 182, and thus include instructions to interface with the runtime system 110 to access handlers for the appropriate data. In an embodiment where the runtime system is Java-based, the runtime callback 132 may be a call from a C object file to a method in a Java class file using JNI, or an instruction from a C object file to retrieve data from an object instance using JNI. However, embodiments are not necessarily limited to any particular type of runtime callback 132.

Native calls 122 and runtime callbacks 132 may recurse any number of levels.

2.5. Example Implementing Architecture

Figure 2:
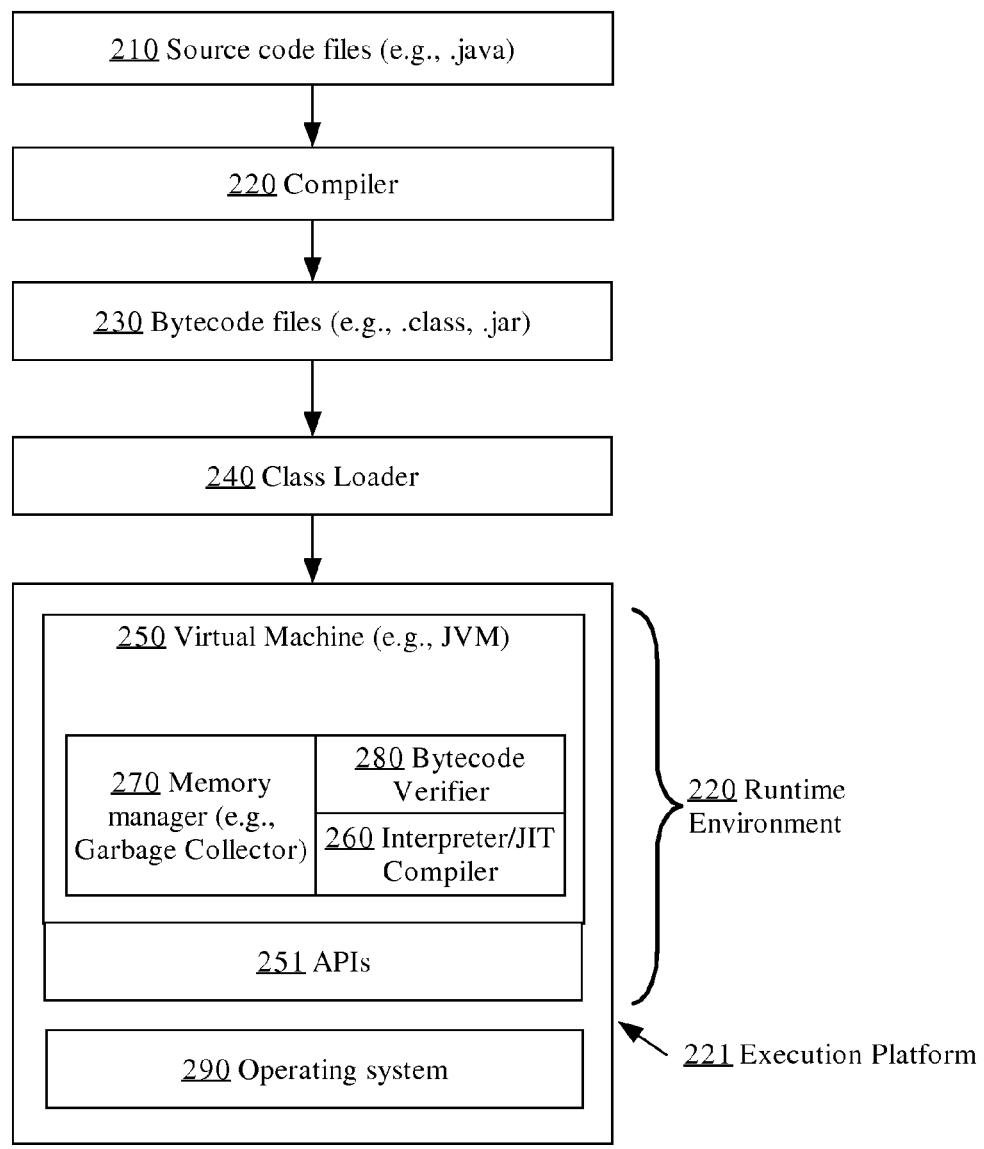
FIG. 2 illustrates an example computing architecture, including a runtime environment, in which techniques described herein may be practiced, according to an embodiment.

FIG. 2 illustrates an example computing architecture 200, including a runtime environment 220, in which techniques described herein may be practiced. The techniques described herein are often described in the context of the Java programming language, the Java Virtual Machine ("JVM"), and the Java Runtime Environment. It is contemplated, however, that the described techniques may be used for any programming language in which managed and native execution modes are implemented.

As illustrated in FIG. 2, a run-time environment 220 includes a JVM 250 that includes various components, such as a Java interpreter 260, which may include a just-in-time (JIT) compiler, such as the HotSpot compiler, and be integrated with garbage collector 270 and/or a bytecode verifier 280 to check the validity of the executable code. The run-time environment 220 may run on top of lower-level software such as an operating system 290, in some embodiments.

In one embodiment, the JVM 250 represents a process virtual machine that executes bytecode stored or otherwise maintained within a Java class library 230. Generally speaking, the Java class library 230 represents a collection of related object code, which in some embodiments may be packaged in one or more JAR files. A common type of object contained in class library 230 is a Java class file that represents a named, distinct unit of code. Class files may be generated by compiler 220 that reads source code files 210.

Class files from the Java class library 230 may be identified by a class-loader 240 to load classes in the JVM 250. More specifically, the class-loader 240 is responsible for locating Java class files in the Java code library 230, reading their contents, and loading the classes into the JVM 250. In some embodiments, the loading may be performed dynamically, in that it does not occur until the class is actually requested by an executing computer program or software application. In the illustrated embodiment, code is loaded from the Java class library 230 into the JVM 250 (e.g., from a disk or over a network) by the class-loader 240. Thus, when the JVM 250 would load bytecode for a particular class, it requests the class-loader 240 to find the bytecode.

2.6. Additional Execution Modes

In some embodiments, managed and native are not the only execution modes. Other managed runtimes may be co-resident with Java, each with its own execution mode, thereby necessitating additional transition contexts. Examples include the Common Language Runtime (CLR), Haskell, and Swift. Still more execution modes arise for special contexts. These include interactive debugging such as with breakpoints, special monitoring such as with a profiler, special security such as with a restrictive sandbox or custom security manager, a thrown exception, and a JVM error or panic. Execution modes need not be mutually exclusive. Efficient state transitions and polling, as with safepoints, may apply to these cases.

Execution of a critical section may itself be an additional execution mode. Execution modes may have rules imposed that achieve invariants. For example, managed mode may be obligated to poll for safepoints and to keep managed addresses in appropriate places. Native mode may be obligated to avoid handling managed addresses. Critical section mode does not have these restrictions.

3.0. Functional Overview

3.1. Executing Calls in Execution Modes

Figure 3:
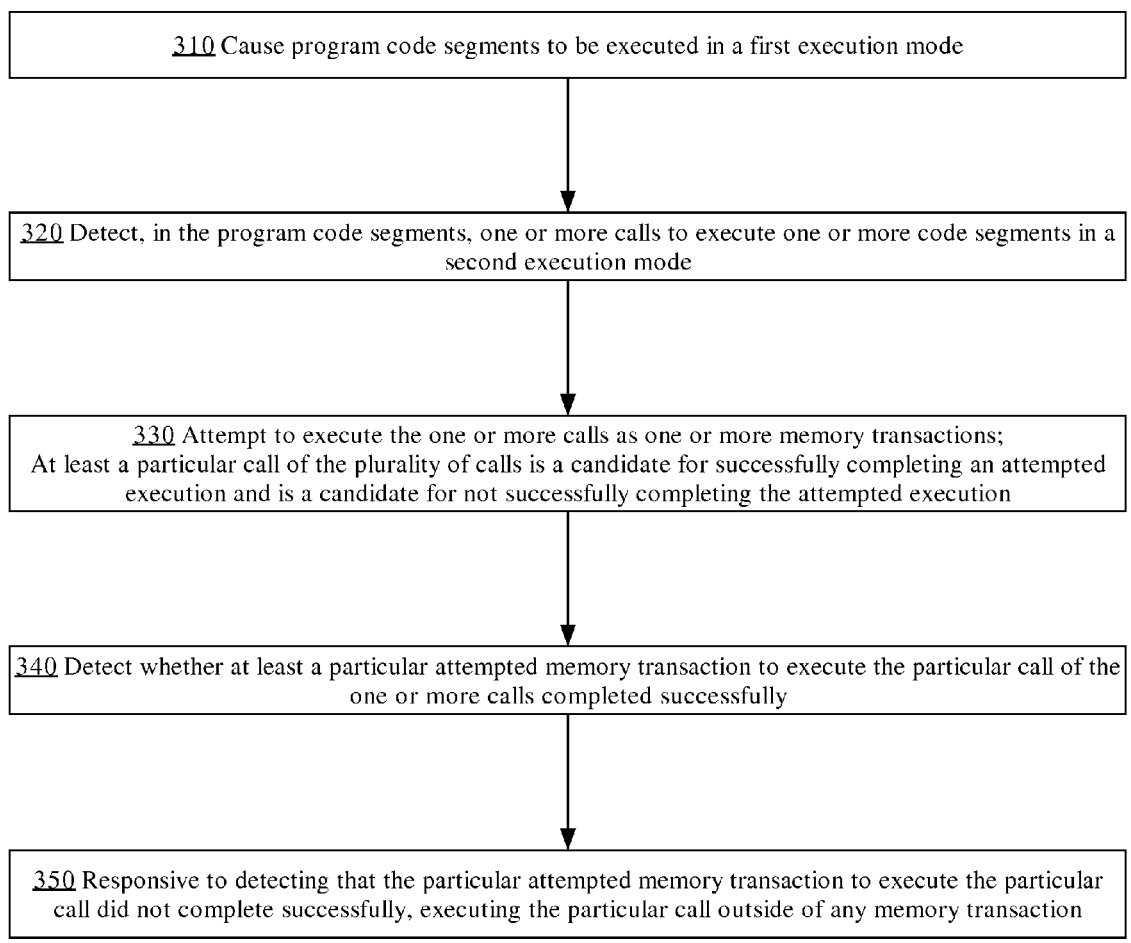
FIG. 3 illustrates an example process flow for executing a native call, according to an embodiment.

FIG. 3 illustrates an example process flow 300 for executing a call, according to an embodiment. The various elements of flow 300 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 300 is one example of a flow for executing a call. Other flows may comprise fewer or additional elements, in varying arrangements.

In an embodiment, flow 300 is performed by a thread such as thread 140 working in coordination with a runtime system, such as runtime system 110. The runtime system may issue instructions to the thread that cause performance of flow 300 while interpreting various code segments, such as managed code segments 120. Or, a compiler may compile code comprising instructions that implement flow 300.

Block 310 comprises executing instructions in a first execution mode. For instance, a thread 140 may execute instructions from managed code segment 120a, at the request of or with the assistance of runtime system 110 and runtime services 112. In this managed execution mode, various rules are imposed upon the thread to ensure that runtime services are properly provided to the thread and potentially other threads.

Block 320 comprises detecting calls, to execute instructions in a second execution mode. These calls are then executed using blocks 330 through 350.

Block 330 comprises transitioning from the first execution mode to the second execution mode by performing various operations that are necessary for the transition, as described in other sections. For convenience, this transition may be referred to herein as an egress transition. At least a particular call of the detected calls is a candidate for successfully completing an attempted execution and is a candidate for not successfully completing the attempted execution. Block 330 also comprises jumping to the code segment that is referenced in the call. For instance, if the call is to a C function, the thread jumps to the address at which the instructions for executing the C function are found.

Block 340 comprises detecting whether the attempted memory transaction to execute the particular call completed successfully. In this example the particular calls fails, and the failure is detected.

Block 350 handles a failed call. Responsive to detecting that the particular attempted memory transaction to execute the particular call did not complete successfully, the particular call is then executed outside of any memory transaction.

3.2. Executing Native Calls

Figure 4:
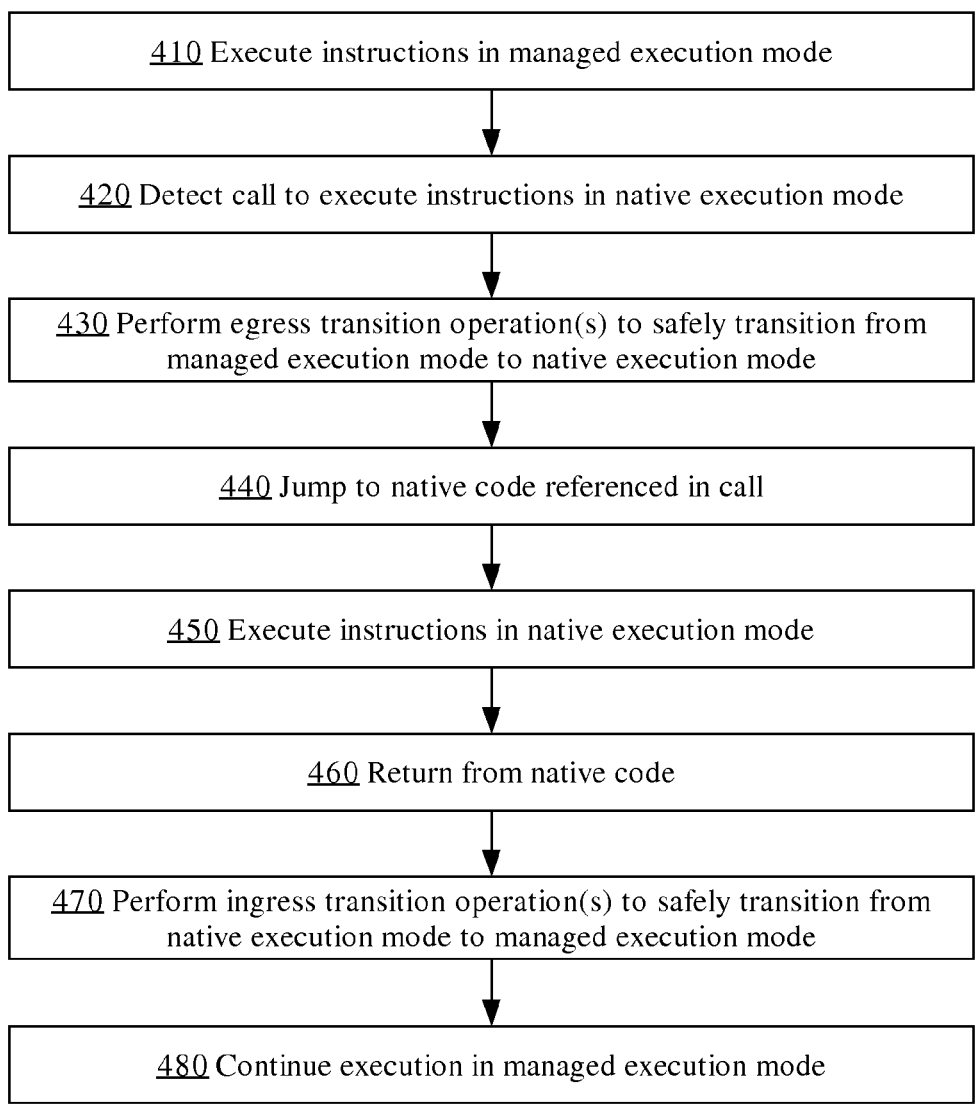
FIG. 4 illustrates a more detailed example process flow for using a hardware transaction to execute a native call, according to an embodiment.

FIG. 4 illustrates an example process flow 400 for executing a native call, such as native call 122a or native call 122b, according to an embodiment. The various elements of flow 400 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 400 is one example of a flow for executing a native call. Other flows may comprise fewer or additional elements, in varying arrangements.

In an embodiment, flow 400 is performed by a thread such as thread 140 working in coordination with a runtime system, such as runtime system 110. The runtime system may issue instructions to the thread that cause performance of flow 400 while interpreting various code segments, such as managed code segments 120. Or, a compiler may compile code comprising instructions that implement flow 400.

Block 410 comprises executing instructions in a managed execution mode. For instance, a thread 140 may execute instructions from managed code segment 120a, at the request of or with the assistance of runtime system 110 and runtime services 112. In this managed execution mode, various rules are imposed upon the thread to ensure that runtime services are properly provided to the thread and potentially other threads.

Block 420 comprises detecting a call, such as native call 122a, to execute instructions, such as native code segment 130a, in a native execution mode. This native call is then executed using blocks 430 through 470.

Block 430 comprises transitioning from the managed execution mode to the native execution mode by performing various operations that are necessary for the transition, as described in other sections. For convenience, this transition may be referred to herein as an egress transition.

Block 440 comprises jumping to the native code segment that is referenced in the call. For instance, if the call is to a C function, the thread jumps to the address at which the instructions for executing the C function are found.

Block 450 comprises executing the instructions in the native code segment. The instructions are executed in a native execution mode that is not managed by the runtime. As such, different rules, or even no rules, are imposed upon the execution of the instructions. For instance, in this native execution mode, the instructions may not be required to poll for safepoints or pause for runtime services.

Block 460 comprises, upon terminating execution of the native code segment, returning from the native code segment back to the sequence of instructions from which the native call was made.

Block 470 comprises transitioning from the native execution mode to the managed execution mode by performing various operations that are necessary for the transition, as described in other sections. For convenience, this transition may be referred to herein as an ingress transition. The operations are not necessarily the same as those of block 430.

Block 480 comprises continuing execution of the thread in the managed execution mode.

3.3. Transitioning Between Modes

As explained above, transitions between execution modes may occur during any or all of making a native call, returning from a native call, making a runtime callback, or returning from the runtime callback. These transitions between a managed execution mode and native execution mode may involve a number of necessary operations, depending on the embodiment.

For example, before being permitted to execute a native code segment, a thread may be required to determine whether a set of one or more conditions have been met. If the condition(s) are not met, the thread must wait until the conditions are met before executing the native code segment. As another example, the thread may be required to report to the runtime system that the thread is entering the native execution mode. Similarly, the thread may be required to wait for another set of one or more conditions to be met before returning back from the native execution mode.

More generally, a managed execution mode may be viewed as a mode in which one set of rules is imposed upon execution of instructions, while a native execution mode may be viewed as a mode in which a different set of rules, or even no set of rules, is imposed upon the execution of instructions. Transitioning between the modes thus comprises enforcing rules associated with the corresponding transition prior to leaving one mode and entering the other mode.

In an embodiment, the rules for transitioning to and/or from one mode to another mode may involve writing various data structures to areas in a memory, such as memory 180. For instance, the rules may require a thread to write state information to the memory so that the runtime system is aware that the thread is no longer in managed execution mode, and that various runtime services that would otherwise require a thread to pause should proceed without waiting for the thread to indicate that it has paused. Or, a thread may be required to write to a memory barrier or other locking structure to ensure that ordering constraints between threads are properly maintained while the thread is in native execution mode.

In an embodiment, while a thread is in a native execution mode, runtime services are still provided to other threads. Consequently, when a thread returns from native execution mode, the thread may be required to perform various checks to ensure that its previous understanding of the state of various memory structures and/or threads is still correct. In an embodiment, one or both of the transitions may require checking to see if the thread is required to pause so that pending garbage collection tasks (and/or other services) may be provided. This check may again require accessing or otherwise utilizing various locking mechanisms.

For certain embodiments in which the runtime system is Java-based, when reentering Java code from native execution mode, each thread stores state information into its state field, issues a memory barrier instruction known as a membar or fence, and checks a safepoint pending flag. When the runtime system issues a safepoint, the safepoint pending flag is updated and another membar instruction is executed. The runtime system then iterates over all threads, checking each thread's state field, and waiting for those in managed mode to rendezvous before performing the operations for which the safepoint was issued. In one such embodiment, when re-entering Java code, a fence is eliminated after storing into the state field by adding code to the safepoint mechanism to implement an Asymmetric Dekker Synchronization, as described in U.S. Pat. No. 7,644,409, the entire contents of which are hereby incorporated by reference for all purposes as if set forth herein.

3.4. Executing Native Code Using Memory Transactions

A memory transaction, within the meaning of this application, is a set of instructions that are executed speculatively under the optimistic assumption that other threads will not perform certain conflicting memory operations during performance of the set of instructions. For instance, the transaction may assume that no other thread will write to a certain memory area to which the transaction writes, or from which the transaction would normally need to read.

To support a memory transaction as a hardware transaction, a processor may have access to a large cache buffer in which it caches copies of data structures accessed during the transaction. If the transaction is successful, the processor may write the cached data structures to memory, as needed. If the transaction is not successful, the data structures are never written. If, over the course of a transaction, another thread accesses a data structure written by the transaction, a conflict is said to occur, and the transaction is "rolled back." In some implementations, the transaction may be attempted again, or the processor may perform designated fallback code. In other implementations, it is left to the thread that requested the transaction to determine how to respond to the failure.

In an embodiment, when the processor of a system includes hardware support for transaction instructions, the execution of native code segments called by native calls from within managed code segments may be improved by attempting to execute the native call in a single hardware transaction. As used herein, executing the native call as a transaction means that not only is the code segment referenced by the native call executed as a transaction, but also that any checks, writes, or other instructions normally performed when transitioning between managed execution mode and native execution mode are performed within the transaction, unless those instructions are rendered obsolete by the nature of the transaction (as explained subsequently). If the transaction fails at any point, whether during one of the transitions or during execution of the native code, then the native call may be executed through normal means, using techniques as already explained above. Alternatively, an embodiment may retry a failed transaction.

In an embodiment where managed code is interpreted, the runtime system may be configured to determine if the executing processor supports hardware transactions. If so, then the runtime system may then issue instructions to cause the processor to attempt to execute the transitions and native code using a hardware transaction. Otherwise, or if the hardware transaction fails, the runtime system may instead issue normal instructions to execute the transitions and native code outside of a transaction. Or, the instructions that cause the processor to attempt to execute the transaction may also include fallback instructions that are executed automatically by the processor in event of the transaction failing.

In an embodiment where managed code is compiled, either in advance and/or dynamically at runtime, the compiled code may be generated to include logic similar to that employed by the interpreter, such as logic branches based on whether the processor supports hardware transactions, and whether the attempted transaction was successful. Or, in embodiments with dynamic compilation, the code may be compiled to optimistically assume that the transaction will succeed. Guard code within the compiled code may catch situations when the transaction fails. When a failure is caught, the guard code may cause the runtime system to de-optimize the compiled code and instead execute managed code by interpretation or a less optimized version of the compiled code, in which the transitions and native code are executed outside of any hardware transaction.

Figure 5:
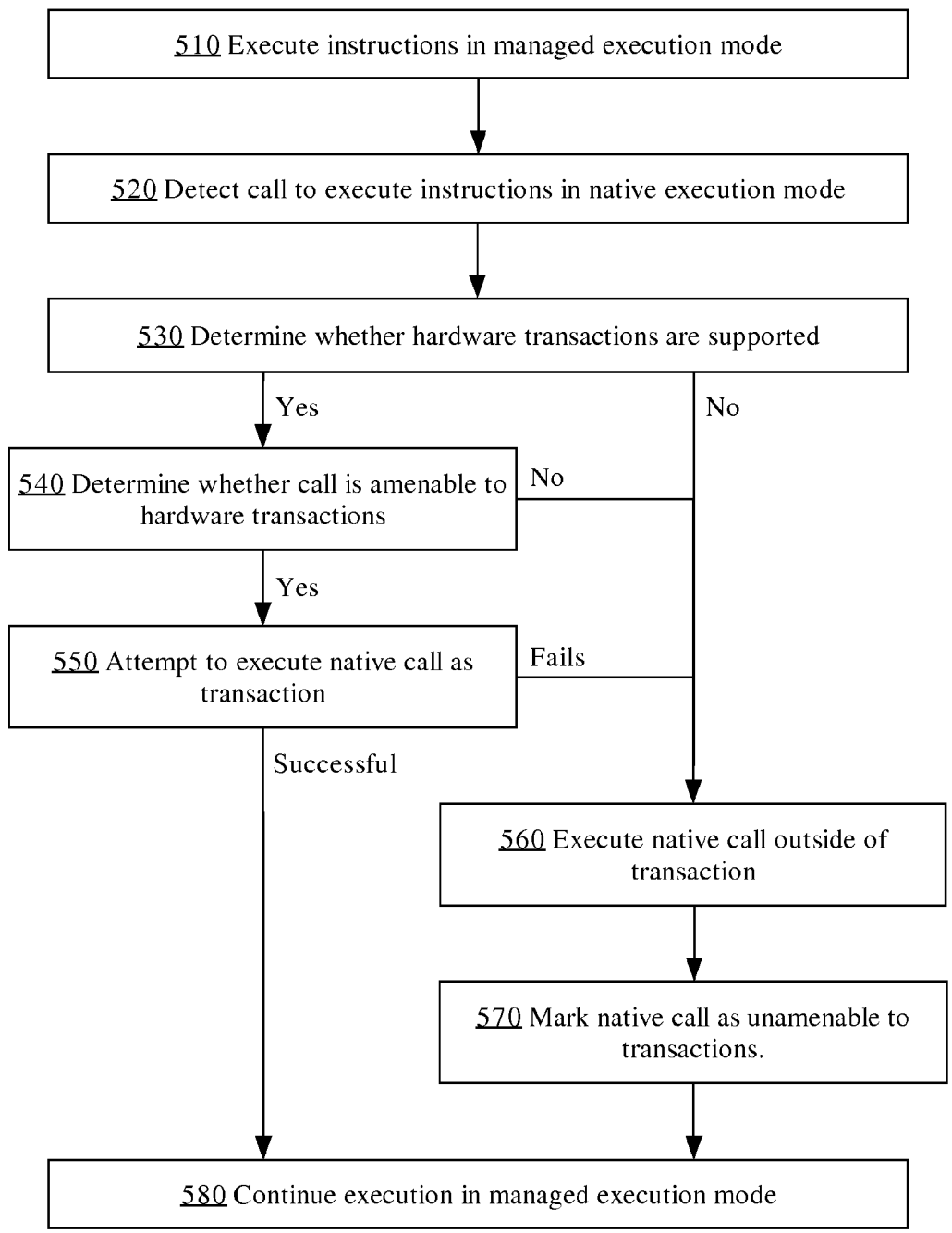
FIG. 5 is a block diagram that illustrates a computer system upon which an embodiment of the invention may be implemented.

FIG. 5 illustrates a more detailed example process flow 500 for using a hardware transaction to execute a native call, according to an embodiment. The various elements of flow 500 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

As with flow 400, flow 500 is performed by a thread such as thread 150 working in coordination with a runtime system, such as runtime system 110. The runtime system may issue instructions to the thread that cause performance of flow 500 while interpreting various code segments, such as managed code segments 120. Or, a compiler may compile code comprising instructions that implement flow 500.

Blocks 510 and 520 proceed as with blocks 410 and 420. Block 530 comprises determining whether hardware transactions are supported. Block 530 may be optional. For instance, in embodiments where flow 500 is guaranteed to be performed in a system comprising only processors that support hardware transactions, block 530 is unnecessary. If hardware transactions are not supported, flow proceeds to block 560.

If hardware transactions are supported, or if block 530 is not performed, then flow proceeds to block 540. Block 540 comprises determining whether the call detected in block 520 is amendable to hardware transactions. The determination may be based on any of a variety of data. For instance, based on the types of operations in the native code referenced by the call, the length of the native code, the context in which the call occurs, and/or the state of other executing threads, it may be determined that the call is not amendable to hardware transactions. As another example, based on profiling information or other statistics (e.g. collected from block 570), it may be determined that the call is not amenable to hardware transactions. As with block 530, block 540 may be optional in some embodiments. If the call is not amendable to hardware transactions, flow proceeds to block 560.

If the call is amendable to hardware transactions, or if block 540 is not performed, flow proceeds to block 550. Block 550 comprises attempting to execute the native call as an all-or-nothing hardware transaction by issuing to a processor, in association with a hardware transaction, instructions to perform steps having an equivalent result as those found in blocks 430-470, assuming certain assumptions hold true. The processor will then attempt to execute the instructions as a single transaction. If the transaction completes successfully, then any changes to data structures that occurred during the transaction are written to memory. The native call and the associated transitions are considered to be complete, and flow proceeds to block 580. If on the other hand the processor detects an inconsistency at any point, then the transaction fails. All instructions in the transaction, and all changes made by those instructions, even if already performed, are "rolled back." Flow proceeds to block 560.

Block 560 comprises executing the native call outside of a transaction. Each instruction of blocks 430-470 is performed in succession, without the context of the transaction.

Block 570, which may be optional, comprises marking the native call as being unamenable to hardware transactions. Block 570 may be performed any time block 560 is performed, or only when additional criteria are met, such as after a certain number of attempts to execute the native call as a transaction having already failed.

In other words, when executing a native call as a transaction does fail, or at least fails more than a threshold number of times, the native call is marked, through profiling or other means, as being unamenable to hardware transactions. This may be the case, for instance, if the native call is relatively long or complex, or likely to be executed at times when conflicts with other threads may arise. Based on the native call being marked as unamenable to hardware transactions, an interpreter may cease to attempt to execute the native call as a hardware transaction, or a dynamic compiler may cease to compile the native call in such a way that a hardware transaction is requested.

Block 580 comprises continuing to execute in managed execution mode, as in block 480.

Flow 500 is one example of a flow for using a hardware transaction to execute a native call. Other flows may comprise fewer or additional elements, in varying arrangements. For instance, the orders of block 530 and block 540 may be switched. Or, the determinations may be made at compile time, in advance of block 510.

In an embodiment, the interpreter and/or compiled code may be configured to attempt to execute native calls, or at least certain types of native calls, as hardware transactions more than once before reverting to instructions outside of a transaction. This may be useful if, for instance, profiling data or other types of statistics indicate that a transaction will succeed the vast majority of the time, and it may thus be acceptable to repeat an attempt to execute a transaction on the rare occasions that the transaction does fail.

3.5. Efficient Execution of Native Code within a Transaction

As explained above, the egress and ingress transitions involved in executing a native call require following various rules to ensure that certain criteria are met and/or inform the runtime system or other threads that the thread has transitioned to native execution mode. Various example techniques for accomplishing these objectives are described above. In one embodiment, the transaction of block 550 may use the same instructions to accomplish these objectives as used outside of the transaction in block 560.

In other embodiments, however, when executing a native call via a transaction as opposed to outside of the transaction, the instructions used to execute the egress and/or ingress transitions may be optimized based on optimistic assumptions that the requisite criteria will be met and/or that the execution will occur quickly enough that neither the runtime system nor any other thread will need to be informed that the transition was ever made.

For instance, utilizing a transaction, various checks and/or memory writes that would normally be needed during transitions between modes may be omitted, simply by asserting that the criteria will be met and/or that the memory write will never be needed. Instead, the processor is instructed to monitor the memory areas storing the data structures that would otherwise be checked or written and, if the data structures are updated and/or accessed, cause the related transactions to fail. Hence, the native call is executed via more efficient instructions the majority of the time, at the expense of having to roll back those instructions and proceed along a different path on rare occasions when the assumption(s) do not hold true.

In an embodiment, an advantage of a transaction may be that, if, during the course of the transaction, a data structure having a first value is temporarily overwritten with a second value, but then returned to the first value before the transaction concludes, it is not actually necessary to ever write the second value to memory 180. For instance, the various rules governing a transition from a managed execution mode to a native execution mode may require writing data to a data structure in memory 180, such as to locking mechanism 184 or to a state field. The rules governing a transition back from the native execution mode to the managed execution mode may involve returning the data structure back to its original state. If the two transitions, along with the native code execution, can all be performed in a hardware transaction, then the native code can be executed without the expense of writing to this data structure multiple times.

Moreover, rather than actually perform the write operation, the code for the transaction can be configured to optimistically assume that the write operation will never actually be needed, because no thread will ever see the results of the write operation. The transaction code "subscribes" to read requests on the relevant data structure. With the transaction code subscribed to the data structure, the processor determines whether any threads attempt to read the data structure. If no reads are detected, then the transaction succeeds. Otherwise, the transaction fails.

As another example, if a runtime system implements a safepoint mechanism, the transaction may allow code transitioning back into managed execution code to avoid polling for a safepoint. At the beginning of the transaction, the transaction may fetch and subscribe to a lock used by the safepoint mechanism. If the runtime system ever updates the lock (e.g. as a consequence of deciding to issue a safepoint), the transaction will fail. On the other hand, the runtime system does not update the lock over the course of the transaction, then at the conclusion of the transaction, the thread has safely transitioned back from the native mode without having to poll for a safepoint.

3.6. Optimization of Runtime Callbacks

In an embodiment, both native calls and runtime callbacks may be made more efficient through the use of hardware transactions. If a runtime callback is made during execution of native code that was called by a native call, and is currently already running in a transaction, several options are possible, depending on the embodiment. For example, the runtime system may be kept aware that the runtime callback is occurring within the context of an existing transaction, and attempt to optimize various transition operations accordingly, using techniques analogous to those already described. Or, if supported by the hardware, the runtime system may attempt to execute the runtime callback in a nested transaction, using a flow similar to flow 500. An embodiment may execute a callback as a transaction even though the invoking native code is not in any transaction.

In an embodiment, arguments may be passed from managed code to native code. Conventionally, these arguments are handles that indirectly reference certain data structures in managed memory. Indirect handles are used instead of actual memory addresses for reasons such as, as a result of various runtime services, the data structures that were intended to be passed to the native code may move. Hence, the native code must make a callback to the runtime system to locate the data structure referenced by the handle. This can be a relatively expensive operation. Another optimization made possible by a transaction is to pass raw memory addresses as arguments to native code segments instead of handles, under the assumption that the data structures will not move. If the data structures at the raw memory addresses are touched during the course of the transaction, then it is assumed that the structures may have moved, and the transaction fails. If the data structures at the raw memory addresses are not touched during the course of the transaction, then the native code segment may be performed without needing to call back to the runtime system to locate the data structures.

3.7. Eliding Transitions in Consecutive Native Calls

When executing several native calls back to back, in an embodiment, some of the transitions may be elidable. Specifically, an execution of an ingress transition followed by an egress transition may be removable, leading to a larger span of code that is locked or protected by the remaining egress transition and ingress transition at the very beginning and end of the sequence. This process may be iterated, to accumulate larger blocks of instructions to be executed in native execution mode. In an embodiment, elision of transitions may be an optional choice that an interpreter or compiler may make based on how long the total transaction would be and/or other factors. For instance, it may be desirable to bundle shorter native calls, but bundling longer native calls may be undesirable since it may increase the likelihood that the resulting transaction would fail.

3.8. Miscellaneous

Among other aspects, systems that utilize the described techniques may realize increased performance on account of more efficient native calls. Moreover, the efficiency of the native calls may impact patterns of instructions that are executed by supporting hardware, in that software developers may be more likely to write shorter native code segments that are used more frequently, rather than trying to batch many native operations together in a single native code segment to amortize the cost of switching into native mode.

4.0. Example Embodiments

Example embodiments are represented in the following numbered clauses:

1. A method comprising: causing program code segments to be executed in a managed execution mode; detecting, in the program code segments, native calls to execute native code segments in a native execution mode; causing one or more processors to: attempt to execute the native calls as hardware transactions; detect that at least a first attempted hardware transaction to execute a first native call of the native calls completed successfully; and responsive to detecting that a second attempted hardware transaction to execute a second native call of the native calls did not complete successfully, the second native call outside of any hardware transaction.

2. The method of Clause 1, wherein executing a given native call of the native calls outside of any hardware transaction would require at least a first transition operation to safely transition from the managed execution mode to the native execution mode or to safely transition from the native execution mode to the managed execution mode; wherein attempting to execute the given native call as a hardware transaction comprises utilizing transactional features of the hardware transaction to attempt to omit the first transition operation.

3. The method of Clause 2, wherein the first transition operation is one of: obtaining a lock, polling for a safepoint, or writing status information.

4. The method of any of Clauses 1-3, wherein attempting to execute the first attempted hardware transaction comprises generating optimized transition code for transitioning between the managed execution mode and the native execution mode, the transition code optimized based on an assumption that a particular data structure will not be read by any other thread during the attempted first hardware transaction, wherein the optimized transition code does not comprise writing to the particular data structure.

5. The method of any of Clauses 1-4, wherein: executing the second native call outside of any hardware transaction comprises performing a transition operation when transitioning between the managed execution mode and the native execution mode, the transition operation comprising writing a value to a particular data structure in a memory that is shared amongst multiple threads; wherein attempting to execute the second attempted hardware transaction comprises generating optimized transition code based on an assumption that the particular data structure will not be read by any other thread during the attempted second hardware transaction, wherein the optimized transition code does not comprise writing to the particular data structure; the method further comprising causing the one or more processors to terminate the second attempted hardware transaction unsuccessfully responsive to determining that another thread has read the particular data structure during the attempted second hardware transaction.

6. The method of any of Clauses 4-5, wherein the particular data structure is a status field that indicates that a thread in which the first native call or the second native call was made is in the native execution mode.

7. The method of any of Clauses 1-6, wherein attempting to execute the first attempted hardware transaction comprises generating optimized transition code for transitioning between the managed execution mode and the native execution mode, the transition code optimized based on an assumption that a particular data structure will not change during the attempted first hardware transaction, wherein the optimized transition code does not comprise polling for a value of the particular data structure.

8. The method of any of Clauses 1-7, wherein: executing the second native call outside of any hardware transaction comprises performing a transition operation when transitioning between the managed execution mode and the native execution mode, the transition operation comprising determining whether a condition is met based on a particular data structure in a memory that is shared amongst multiple threads; wherein attempting to execute the second attempted hardware transaction comprises generating optimized transition code based on an assumption that the particular data structure will not change during the attempted first hardware transaction, wherein the optimized transition code does not comprise polling for a value of the particular data structure; the method further comprising causing the one or more processors to terminate the second attempted hardware transaction unsuccessfully responsive to determining that particular data structure has changed during the attempted second hardware transaction.

9. The method of any of Clauses 7-8, wherein the particular data structure is a flag that indicates that all threads in a runtime environment must pause for a certain period of time.

10. The method of any of Clauses 1-9, wherein executing the program code segments in the managed execution mode comprises providing one or more services with respect to execution of the program code segments, wherein executing the native code segments does not comprise providing the one or more services.

11. The method of Clause 10, wherein the one or more services include one or more of automated memory management services, optimization or de-optimization services, profiling services, debugging services, or lock management services.

12. The method of any of Clauses 1-11, wherein attempting to execute the first attempted hardware transaction comprises passing first arguments by memory address to first native code referenced by the first native call; wherein attempting to execute the second attempted hardware transaction comprises passing second arguments by memory address to second native code referenced by the second native call; wherein executing the second native call outside of the transaction comprises passing the second arguments by handles and temporarily returning to the managed execution mode to identify addresses associated with the handles.

13. The method of any of Clauses 1-12, further comprising: detecting consecutive native calls; attempting to perform the consecutive native calls as a single hardware transaction.

14. The method of any of Clauses 1-13, wherein the method is performed by an interpreter or compiler.

15. The method of any of Clauses 1-14, further comprising: marking the second native call as being unamenable to hardware transactions; based on the marking, determining not to subsequently attempt to execute the second native call as a hardware transaction.

16. The method of any of Clauses 1-15, wherein attempting to execute the native calls as hardware transactions is responsive to determining that the one or more computing devices include a processor configured to support the hardware transactions.

17. One or more non-transitory computer-readable media storing instructions which, when executed by one or more computing devices, cause performance of: executing a first portion of program code in a managed execution code; detecting, in the program code, a native call to native code that is to be executed in a native execution mode; attempting to execute the native call in the native execution mode using a hardware transaction; if the hardware transaction fails, executing the native call in the native execution mode outside of any hardware transaction; upon successful completion of the hardware transaction, or upon executing the native call outside of any hardware transaction, executing a second portion of the program code in the managed execution mode.

18. The one or more non-transitory computer-readable media of Clause 17, wherein the instructions, when executed by the one or more computing devices, further cause: when executing the native call outside of any hardware transaction, performing at least a first transition operation to safely transition from the managed execution mode to the native execution mode or to safely transition from the native execution mode to the managed execution mode; wherein attempting to execute the native call as the hardware transaction comprises utilizing transactional features of the hardware transaction to attempt to omit the first transition operation.

19. The one or more non-transitory computer-readable media of Clause 18, wherein the first transition operation is one of: obtaining a lock, polling for a safepoint, or writing status information.

20. The one or more non-transitory computer-readable media of any of Clauses 17-19, wherein executing the native call outside of any hardware transaction comprises performing a transition operation when transitioning between the managed execution mode and the native execution mode, the transition operation comprising writing a value to a particular data structure in a memory that is shared amongst multiple threads; wherein attempting to execute the hardware transaction comprises generating optimized transition code based on an assumption that the particular data structure will not be read by any other thread during the hardware transaction, wherein the optimized transition code does not comprise writing the value to the particular data structure; wherein the instructions, when executed by the one or more computing devices, further cause terminating the hardware transaction unsuccessfully responsive to determining that another thread has read the particular data structure during the hardware transaction.

21. The one or more non-transitory computer-readable media of Clause 20, wherein the particular data structure is a status field that indicates that a thread in which the first native call or the second native call was made is in the native execution mode.

22. The one or more non-transitory computer-readable media of any of Clauses 17-21, wherein: executing the native call outside of any hardware transaction comprises performing a transition operation when transitioning from the managed execution mode to the native execution mode, the transition operation comprising determining whether a condition is met based on a particular data structure in a memory that is shared amongst multiple threads; wherein attempting to execute the hardware transaction comprises generating optimized transition code based on an assumption that the particular data structure will not change during the hardware transaction, wherein the optimized transition code does not comprise polling for a value of the particular data structure; wherein the instructions, when executed by the one or more computing devices, further cause terminating the hardware transaction unsuccessfully responsive to determining that particular data structure has changed during the hardware transaction.

23. The one or more non-transitory computer-readable media of Clause 22, wherein the particular data structure is a flag that indicates that all threads in a runtime environment must pause for a certain period of time.

24. The one or more non-transitory computer-readable media of any of Clauses 17-23, wherein executing the program code in the managed execution mode comprises providing one or more services with respect to execution of the program code, wherein executing the native code does not comprise providing the one or more services.

25. The one or more non-transitory computer-readable media of Clause 24, wherein the one or more services include one or more of automated memory management services, optimization or de-optimization services, profiling services, debugging services, or lock management services.

26. The one or more non-transitory computer-readable media of any of Clauses 17-25, wherein attempting to execute the hardware transaction comprises passing arguments to the native code by address; wherein executing the native call outside of the transaction comprises passing the arguments by handles and temporarily returning to the managed execution mode to identify addresses associated with the handles.

27. The one or more non-transitory computer-readable media of any of Clauses 17-26, wherein the instructions, when executed by the one or more computing devices, further cause: detecting consecutive native calls; attempting to perform the consecutive native calls as a single hardware transaction.

28. The one or more non-transitory computer-readable media of any of Clauses 17-27, wherein the instructions, when executed by the one or more computing devices, further cause: marking the native call as being unamenable to hardware transactions; based on the marking, determining not to subsequently attempt to execute the native call as a hardware transaction.

29. The one or more non-transitory computer-readable media of any of Clauses 17-27, wherein attempting to execute the native call as a hardware transaction is responsive to determining that the one or more computing devices include a processor configured to support the hardware transaction.

5.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
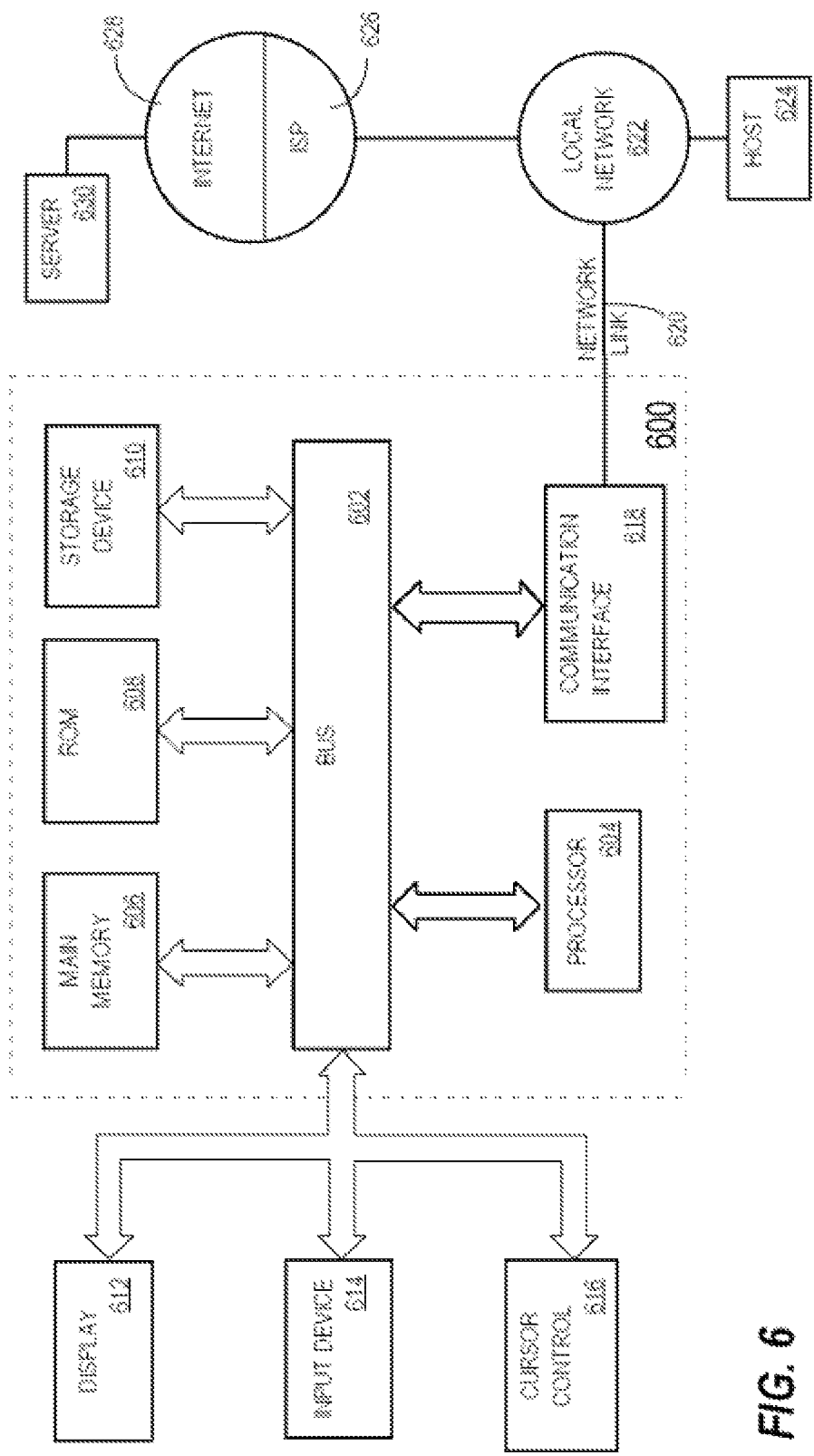

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
causing program code segments to be executed in a managed execution mode;
detecting, in the program code segments, a plurality of consecutive native calls to execute one or more native code segments in a native execution mode;
causing one or more processors to:
attempt to execute the plurality of consecutive native calls as a memory transaction, wherein at least a particular call of the plurality of consecutive native calls is a candidate for successfully completing an attempted execution and is a candidate for not successfully completing the attempted execution;
detect whether a particular attempted memory transaction to execute the plurality of consecutive native calls completed successfully;
responsive to detecting that the particular attempted memory transaction to execute the plurality of consecutive native calls did not complete successfully, executing the plurality of consecutive native calls outside of any memory transaction;

wherein the method is performed by one or more computing devices.

2. The method of claim 1,
wherein executing the particular call of the plurality of consecutive native calls outside of any memory transaction would require at least a first transition operation to safely transition from the managed execution mode to the native execution mode or to safely transition from the native execution mode to the managed execution mode;
wherein attempting to execute the plurality of consecutive native calls as a memory transaction comprises utilizing transactional features of the memory transaction to attempt to omit the first transition operation.

3. The method of claim 2, wherein the first transition operation is one of: polling for a safepoint, storing an argument address into a handle, or writing status information.

4. The method of claim 2, wherein a second transition operation is one of: polling for a safepoint, storing an argument address into a handle, or writing status information.

5. The method of claim 1, wherein executing the program code segments in the managed execution mode comprises providing one or more services with respect to execution of the program code segments, wherein executing the one or more native code segments in the native execution mode does not comprise providing all of the one or more services.

6. The method of claim 1,
wherein attempting to execute the particular attempted memory transaction comprises passing first arguments by memory address to first native code referenced by the particular call;
wherein the method further comprises attempting to execute a second attempted memory transaction by passing second arguments by memory address to second native code referenced by a second native call;
wherein executing the second native call outside of the transaction comprises passing the second arguments by handles and temporarily returning to the managed execution mode to identify addresses associated with the handles.

7. The method of claim 1, wherein attempting to execute the plurality of consecutive native calls as memory transactions is responsive to determining that the one or more computing devices include a processor configured to support hardware transactions, and wherein attempting to execute the plurality of consecutive native calls as memory transactions comprises attempting to execute the plurality of consecutive native calls as hardware transactions.

8. The method of claim 1 wherein the native execution mode comprises execution of a critical section.

9. A method comprising:
causing program code segments to be executed in a managed execution mode;
detecting, in the program code segments, one or more native calls to execute one or more native code segments in a native execution mode;
causing one or more processors to:
attempt to execute the one or more native calls as one or more memory transactions, wherein at least a particular call of the one or more native calls is a candidate for successfully completing an attempted execution and is a candidate for not successfully completing the attempted execution;
detect whether at least a particular attempted memory transaction to execute the particular call of the one or more native calls completed successfully;
responsive to detecting that the particular attempted memory transaction to execute the particular call did not complete successfully, executing the particular call outside of any memory transaction and performing a transition operation when transitioning between the managed execution mode and the native execution mode, the transition operation comprising writing a value to a particular data structure in a memory that is shared amongst multiple threads;
wherein attempting to execute the particular attempted memory transaction comprises generating optimized transition code based on an assumption that the particular data structure will not be read by any other thread during the particular attempted memory transaction, wherein the optimized transition code does not comprise writing to the particular data structure;
the method further comprising causing the one or more processors to terminate the particular attempted memory transaction unsuccessfully responsive to determining that another thread has read the particular data structure during the particular attempted memory transaction;
wherein the method is performed by one or more computing devices.

10. The method of claim 9, wherein the transition operation is one of: polling for a safepoint, storing an argument address into a handle, or writing status information.

11. The method of claim 9, wherein attempt to execute the one or more native calls as one or more memory transactions comprises utilizing transactional features of the memory transaction to attempt to omit a transition operation.

12. A method comprising:
causing program code segments to be executed in a managed execution mode;
detecting, in the program code segments, one or more native calls to execute one or more native code segments in a native execution mode;
causing one or more processors to:
attempt to execute the one or more native calls as one or more memory transactions, wherein at least a particular call of the one or more native calls is a candidate for successfully completing an attempted execution and is a candidate for not successfully completing the attempted execution;
detect whether at least a particular attempted memory transaction to execute the particular call of the one or more native calls completed successfully;
responsive to detecting that the particular attempted memory transaction to execute the particular call did not complete successfully, executing the particular call outside of any memory transaction and performing a transition operation when transitioning between the managed execution mode and the native execution mode, the transition operation comprising determining whether a condition is met based on a particular data structure in a memory that is shared amongst multiple threads;
wherein attempting to execute the particular attempted memory transaction comprises
generating optimized transition code based on an assumption that the particular data structure will not change during the particular attempted memory transaction, wherein the optimized transition code does not comprise polling for a value of the particular data structure;

the method further comprising causing the one or more processors to terminate the particular attempted memory transaction unsuccessfully responsive to determining that particular data structure has changed during the particular attempted memory transaction;

wherein the method is performed by one or more computing devices.

13. The method of claim 12, wherein the transition operation is one of: polling for a safepoint, storing an argument address into a handle, or writing status information.

14. The method of claim 12, wherein attempt to execute the one or more native calls as one or more memory transactions comprises utilizing transactional features of the memory transaction to attempt to omit a transition operation.

15. A method comprising:
causing program code segments to be executed in a managed execution mode;
detecting, in the program code segments, one or more native calls to execute one or more native code segments in a native execution mode;
causing one or more processors to:
attempt to execute the one or more native calls as one or more memory transactions, wherein at least a particular call of the one or more native calls is a candidate for successfully completing an attempted execution and is a candidate for not successfully completing the attempted execution;
detect whether at least a particular attempted memory transaction to execute the particular call of the one or more native calls completed successfully;
responsive to detecting that the particular attempted memory transaction to execute the particular call did not complete successfully, executing the particular call outside of any memory transaction;
attempting to execute a second attempted memory transaction by passing arguments by memory address to native code referenced by a second native call;
marking the second native call as being unamenable to memory transactions;
based on the marking, determining not to subsequently attempt to execute the second native call as a memory transaction.

16. The method of claim 15, wherein executing the program code segments in the managed execution mode comprises providing one or more services with respect to execution of the program code segments, wherein executing the one or more native code segments in the native execution mode does not comprise providing all of the one or more services.

17. The method of claim 15, wherein attempt to execute the one or more native calls as one or more memory transactions comprises utilizing transactional features of the memory transaction to attempt to omit a transition operation.

18. One or more non-transitory computer-readable media storing instructions which, when executed by one or more computing devices, cause:
executing a first portion of program code in a managed execution mode;
detecting, in the program code, a plurality of consecutive native calls to native code that is to be executed in a native execution mode;
attempting to execute the plurality of consecutive native calls in the native execution mode using a memory transaction;
if the memory transaction fails, executing the plurality of consecutive native calls in the native execution mode outside of any memory transaction;
upon successful completion of the memory transaction, or upon executing the plurality of consecutive native calls outside of any memory transaction, executing a second portion of the program code in the managed execution mode.

19. The one or more non-transitory computer-readable media of claim 18, wherein executing the program code in the managed execution mode comprises providing one or more services with respect to execution of the program code, wherein executing the native code in the native execution mode does not comprise providing all of the one or more services.

20. The one or more non-transitory computer-readable media of claim 18,
wherein attempting to execute the memory transaction comprises passing arguments to the native code by address;
wherein executing the plurality of consecutive native calls outside of any memory transaction comprises passing the arguments by handles and temporarily returning to the managed execution mode to identify addresses associated with the handles.

21. The one or more non-transitory computer-readable media of claim 18, wherein attempting to execute the plurality of consecutive native calls as a memory transaction is responsive to determining that the one or more computing devices include a processor configured to support hardware transactions, and wherein attempting to execute the plurality of consecutive native calls as a memory transaction comprises attempting to execute the plurality of consecutive native calls as a hardware transaction.

22. The one or more non-transitory computer-readable media of claim 18, wherein the instructions, when executed by the one or more computing devices, further cause:
when executing the plurality of consecutive native calls outside of any memory transaction, performing at least a first transition operation to safely transition from the managed execution mode to the native execution mode or to safely transition from the native execution mode to the managed execution mode;
wherein attempting to execute the plurality of consecutive native calls as the memory transaction comprises utilizing transactional features of the memory transaction to attempt to omit the first transition operation.

23. The one or more non-transitory computer-readable media of claim 22, wherein the first transition operation is one of: polling for a safepoint, storing an argument address into a handle, or writing status information.

24. One or more non-transitory computer-readable media storing instructions which, when executed by one or more computing devices, cause:
executing a first portion of program code in a managed execution mode;
detecting, in the program code, a plurality of consecutive native calls to native code that is to be executed in a native execution mode;
attempting to execute the plurality of consecutive native calls in the native execution mode using a memory transaction;

if the memory transaction fails, executing the plurality of consecutive native calls in the native execution mode outside of any memory transaction;

upon successful completion of the memory transaction, or upon executing the plurality of consecutive native calls outside of any memory transaction, executing a second portion of the program code in the managed execution mode;

wherein executing the plurality of consecutive native calls outside of any memory transaction comprises performing a transition operation when transitioning between the managed execution mode and the native execution mode, the transition operation comprising writing a value to a particular data structure in a memory that is shared amongst multiple threads;

wherein attempting to execute the memory transaction comprises generating optimized transition code based on an assumption that the particular data structure will not be read by any other thread during the memory transaction, wherein the optimized transition code does not comprise writing the value to the particular data structure;

wherein the instructions, when executed by the one or more computing devices, further cause terminating the memory transaction unsuccessfully responsive to determining that another thread has read the particular data structure during the memory transaction.

25. The one or more non-transitory computer-readable media of claim 24, wherein the transition operation is one of: polling for a safepoint, storing an argument address into a handle, or writing status information.

26. The one or more non-transitory computer-readable media of claim 24, wherein attempt to execute the one or more native calls as one or more memory transactions comprises utilizing transactional features of the memory transaction to attempt to omit a transition operation.

27. One or more non-transitory computer-readable media storing instructions which, when executed by one or more computing devices, cause:
executing a first portion of program code in a managed execution mode;
detecting, in the program code, a plurality of consecutive native calls to native code that is to be executed in a native execution mode;
attempting to execute the plurality of consecutive native calls in the native execution mode using a memory transaction;
if the memory transaction fails, executing the plurality of consecutive native calls in the native execution mode outside of any memory transaction;
upon successful completion of the memory transaction, or upon executing the plurality of consecutive native calls outside of any memory transaction, executing a second portion of the program code in the managed execution mode;
wherein executing the plurality of consecutive native calls outside of any memory transaction comprises performing a transition operation when transitioning from the managed execution mode to the native execution mode, the transition operation comprising determining whether a condition is met based on a particular data structure in a memory that is shared amongst multiple threads;
wherein attempting to execute the memory transaction comprises generating optimized transition code based on an assumption that the particular data structure will not change during the memory transaction, wherein the optimized transition code does not comprise polling for a value of the particular data structure;
wherein the instructions, when executed by the one or more computing devices, further cause terminating the memory transaction unsuccessfully responsive to determining that particular data structure has changed during the memory transaction.

28. The one or more non-transitory computer-readable media of claim 27, wherein the transition operation is one of: polling for a safepoint, storing an argument address into a handle, or writing status information.

29. The one or more non-transitory computer-readable media of claim 27, wherein attempt to execute the one or more native calls as one or more memory transactions comprises utilizing transactional features of the memory transaction to attempt to omit a transition operation.

30. One or more non-transitory computer-readable media storing instructions which, when executed by one or more computing devices, cause:
causing program code segments to be executed in a managed execution mode;
detecting, in the program code segments, one or more native calls to execute one or more native code segments in a native execution mode;
causing one or more processors to:
attempt to execute the one or more native calls as one or more memory transactions, wherein at least a particular call of the one or more native calls is a candidate for successfully completing an attempted execution and is a candidate for not successfully completing the attempted execution;
detect whether at least a particular attempted memory transaction to execute the particular call of the one or more native calls completed successfully;
responsive to detecting that the particular attempted memory transaction to execute the particular call did not complete successfully,
marking the native call as being unamenable to memory transactions;
based on the marking, determining not to subsequently attempt to execute the native call as a memory transaction.

31. The one or more non-transitory computer-readable media of claim 30:
wherein executing the program code segments in the managed execution mode comprises providing one or more services with respect to execution of the program code;
wherein executing the native code in the native execution mode does not comprise providing all of the one or more services.

32. The one or more non-transitory computer-readable media of claim 30, wherein attempt to execute the one or more native calls as one or more memory transactions comprises utilizing transactional features of the memory transaction to attempt to omit a transition operation.

33. A method comprising:
causing a program code segment to be executed in a native execution mode outside of any memory transaction;
detecting, in the program code segment, a callback to execute a managed code segment in a managed execution mode, wherein the managed code segment consists essentially of bytecode;
causing one or more processors to attempt to execute the callback as a memory transaction;

wherein the method is performed by one or more computing devices.

34. The method of claim 33, wherein execute the callback comprises return a data structure from a managed memory area.

35. The method of claim 33, wherein execute the callback comprises pass an argument by handle.

36. A method comprising:
  causing a program code segment to be executed in a native execution mode as a memory transaction;
  detecting, in the program code segment, a callback to execute a managed code segment in a managed execution mode, wherein the managed code segment consists essentially of bytecode;
  causing one or more processors to attempt to execute the callback within the memory transaction;
  wherein the method is performed by one or more computing devices.

37. The method of claim 36, wherein execute the callback comprises return a data structure from a managed memory area.

38. The method of claim 36, wherein execute the callback comprises pass an argument by handle.

39. A method comprising:
  causing a program code segment to be executed in a native execution mode as a first hardware transaction;
  detecting, in the program code segment, a callback to execute a managed code segment in a managed execution mode, wherein the managed code segment consists essentially of bytecode;
  responsive to determining that one or more processors include a processor configured to support a nested hardware transaction, causing the one or more processors to attempt to execute the callback within a second hardware transaction nested within the first hardware transaction;
  wherein the method is performed by one or more computing devices.

40. The method of claim 39, wherein execute the callback comprises return a data structure from a managed memory area.

41. The method of claim 39, wherein execute the callback comprises pass an argument by handle.

42. One or more non-transitory computer-readable media storing instructions which, when executed by one or more computing devices, cause:
  causing a program code segment to be executed in a native execution mode as a memory transaction;
  detecting, in the program code segment, a callback to execute a managed code segment in a managed execution mode, wherein the managed code segment consists essentially of bytecode;
  causing one or more processors to attempt to execute the callback within the memory transaction.

43. The one or more non-transitory computer-readable media of claim 42, wherein execute the callback comprises return a data structure from a managed memory area.

44. The one or more non-transitory computer-readable media of claim 42, wherein execute the callback comprises pass an argument by handle.

45. One or more non-transitory computer-readable media storing instructions which, when executed by one or more computing devices, cause:
  causing a program code segment to be executed in a native execution mode as a first hardware transaction;
  detecting, in the program code segment, a callback to execute a managed code segment in a managed execution mode, wherein the managed code segment consists essentially of bytecode;
  responsive to determining that one or more processors include a processor configured to support a nested hardware transaction, causing the one or more processors to attempt to execute the callback within a second hardware transaction nested within the first hardware transaction.

46. The one or more non-transitory computer-readable media of claim 45, wherein execute the callback comprises return a data structure from a managed memory area.

47. The one or more non-transitory computer-readable media of claim 45, wherein execute the callback comprises pass an argument by handle.

* * * * *